United States Patent
Hodgson et al.

(10) Patent No.: US 9,475,014 B2
(45) Date of Patent: Oct. 25, 2016

(54) BLENDING SYSTEM AND METHOD FOR PREPARING EMULSIONS

(75) Inventors: Kim A. Hodgson, Sugar Land, TX (US); Clint Adams, Houston, TX (US); Bartley Patton, Sugar Land, TX (US); Alexey Butrim, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 602 days.

(21) Appl. No.: 13/097,147

(22) Filed: Apr. 29, 2011

(65) Prior Publication Data

US 2011/0290492 A1 Dec. 1, 2011

Related U.S. Application Data

(60) Provisional application No. 61/349,564, filed on May 28, 2010.

(51) Int. Cl.
| | |
|---|---|
| *C09K 8/72* | (2006.01) |
| *E21B 21/06* | (2006.01) |
| *B01F 3/08* | (2006.01) |
| *B01F 5/10* | (2006.01) |

(52) U.S. Cl.
CPC ............ *B01F 3/0807* (2013.01); *B01F 5/106* (2013.01); *C09K 8/72* (2013.01); *E21B 21/062* (2013.01); *C09K 2208/00* (2013.01)

(58) Field of Classification Search
None
See application file for complete search history.

(56) References Cited

U.S. PATENT DOCUMENTS

| | | | | |
|---|---|---|---|---|
| 3,722,595 A | * | 3/1973 | Kiel | 166/308.4 |
| 3,934,651 A | | 1/1976 | Nierode et al. | |
| 4,141,767 A | * | 2/1979 | Sudweeks et al. | 149/2 |
| 4,526,633 A | * | 7/1985 | Lawrence et al. | 149/109.6 |
| 4,557,634 A | | 12/1985 | Vidal | |
| 4,635,727 A | * | 1/1987 | Anderson et al. | 166/308.5 |
| 4,732,627 A | * | 3/1988 | Cooper et al. | 149/109.6 |
| 4,966,235 A | * | 10/1990 | Gregoli et al. | 166/267 |
| 6,350,721 B1 | | 2/2002 | Fu et al. | |
| 6,610,158 B2 | | 8/2003 | Lanza Rivas et al. | |
| 6,828,280 B2 | | 12/2004 | England et al. | |
| 6,938,693 B2 | | 9/2005 | Boney et al. | |
| 7,066,260 B2 | | 6/2006 | Sullivan et al. | |
| 7,306,041 B2 | | 12/2007 | Milne et al. | |

(Continued)

FOREIGN PATENT DOCUMENTS

WO    2009074775 A2    6/2009

OTHER PUBLICATIONS

"Ammonium Nitrate" retrieved from http://en.wikipedia.org/wiki/Ammonium_nitrate, Oct. 31, 2013.*

(Continued)

*Primary Examiner* — Angela M DiTrani
(74) *Attorney, Agent, or Firm* — Michael L. Flynn; Tim Curington

(57) ABSTRACT

Systems for preparing emulsions can include a first fluid tank, a second fluid tank, and a circulation loop comprising a buffer tank and a pump, in some arrangements. The first fluid tank and the second fluid tank can be in fluid communication with the circulation loop via a first fluid inlet pipe and a second fluid inlet pipe, respectively. An outlet pipe can be in fluid communication with the circulation loop.

20 Claims, 2 Drawing Sheets

(56) References Cited

U.S. PATENT DOCUMENTS

| | | |
|---|---|---|
| 7,318,475 B2 | 1/2008 | Cavazzoli et al. |
| 7,343,974 B2 | 3/2008 | Cowan |
| 2008/0179062 A1 | 7/2008 | Watkins et al. |
| 2009/0154288 A1* | 6/2009 | Heathman .................... 366/142 |
| 2009/0301725 A1* | 12/2009 | Case et al. ................ 166/308.1 |

OTHER PUBLICATIONS

PCT/IB2011/051930—International Search Report and Written Opinion of the International Search Authority dated Oct. 31, 2011.

Office Action issued in Mexican Patent Appl. No. MX/a/2012/013806 on Feb. 12, 2016; 9 pages (w/ English Translation).

\* cited by examiner

BLENDING SYSTEM AND METHOD FOR PREPARING EMULSIONS

CROSS REFERENCE TO RELATED APPLICATION(S)

This application claims the benefit of and priority to U.S. Provisional Application Ser. No. 61/349,564, filed on May 28, 2010, the entire content of which is incorporated herein by reference.

FIELD OF THE APPLICATION

The current application is generally related to a system and method for preparing emulsions. In particular, the current application is related to a blending system and method for preparing aqueous-hydrocarbon emulsions on-site of a wellsite in relation to a well service procedure, such as an acid stimulation and the like.

BACKGROUND

At the outset, it should be noted that statements made herein merely provide information related to the present disclosure and do not constitute any admission of prior art.

In the oil and gas industry, a subterranean formation (i.e. a "reservoir") often needs to be treated (or "stimulated") to enhance or restore the productivity of a well. Generally speaking, stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

A commonly used method to treat the matrix is "matrix acidizing", which is generally understood in the industry to mean the treatment of a reservoir formation with a stimulation fluid containing a reactive acid. In sandstone formations, the acid reacts with the soluble substances in the formation matrix to enlarge the pore spaces. In carbonate formations, the acid dissolves the entire formation matrix. In each case, the matrix acidizing treatment improves the formation permeability to enable enhanced production of reservoir fluids. Matrix acidizing operations are ideally performed at high rate, but at treatment pressures below the fracture pressure of the formation. This enables the acid to penetrate the formation and extend the depth of treatment while avoiding damage to the reservoir formation.

Typically, the reactive acid comprises hydrochloric acid (HCl) and a blend of acid additives. It is also common for acid treatments to include a range of acid types or blends, such as acetic, formic, hydrochloric, hydrofluoric and fluroboric acids. A few examples are set forth in commonly assigned U.S. Pat. Nos. 6,350,721, 6,828,280, 6,938,693, 7,306,041, 7,066,260, 7,318,475, the contents of which are hereby incorporated by reference into the current application in their entireties.

Depending on the characteristics of the formation and the treatment fluid, it may be helpful to first emulsify the acid before pumping it down the wellbore. The preparation of acid emulsion is traditionally performed off-site, i.e. at a location that is away from the wellsite, and is generally based on a batch mixing method. An example of the prior art system 100 is shown in FIG. 1. There, a large tank (not shown) is employed to re-circulate an acid mixture until a complete homogenous state is achieved. The emulsifying agent is transferred into a batch tank 140 and then the blended acid is added to the batch tank 140. A centrifugal pump 180 (i.e. c-pump) is then used to re-circulate the tank 140 until the desired emulsion is created. Once the emulsion is created, the contents of the batch tank 140 can be delivered to the wellsite as a finished product.

Batch mixing is disadvantageous for several reasons. First, it is often challenging to plan the logistics such as storage and transportation beforehand to ensure sufficient acid is available at the wellsite when an acid treatment needs to be performed on a wellbore. Second, batch-to-batch variations may occur, which could result in inconsistencies in treatment result. Third, degradations may occur during the process of storage and transportation. Fourth, while batch mixing a small volume of acid emulsions is not a significant issue, it can become very difficult when the volumes needed is very large. Accordingly, there is a need to improve the current batch mixing method for preparing acid emulsions.

SUMMARY

According to one aspect of the current application, there is disclosed an on-site emulsifying system comprising a first fluid tank, a second fluid tank, a circulation loop comprising a buffer tank and a pump, wherein the first fluid tank and the second fluid tank are in fluid communication with the circulation loop via a first fluid inlet pipe and a second fluid inlet pipe, respectively, and an outlet pipe that is in fluid communication with the circulation loop. In some embodiments, the on-site emulsifying system further comprises a feeding pipe to a wellbore, where the feeding pipe is in fluid communication with the outlet pipe. In some embodiments, the first fluid and the second fluid are non-miscible.

The first fluid can be an aqueous fluid. The second fluid can be an organic fluid selected from the group consisting of hydrocarbon, diesel oil, kerosene, paraffinic oil, crude oil, LPG, toluene, xylene, ether, ester, mineral oil, biodiesel, vegetable oil, animal oil, and mixtures thereof. In some embodiments, the aqueous fluid tank contains an acid or a blended acid and the organic fluid tank contains an organic fluid mixed with an appropriate amount of an emulsifying agent. In some embodiments, at least one of the first fluid inlet pipe and the second fluid inlet pipe contains a metering valve.

The pump in the on-site emulsifying system can be a centrifugal pump. In some cases, at least one of the first fluid inlet pipe and the second fluid inlet pipe contains a centrifugal pump. In some cases, at least one of the first fluid inlet pipe and the second fluid inlet pipe contains a pre-dispersing device. In a specific embodiment, the outlet pipe contains an electric conductivity meter for monitoring an emulsifying status of an emulsion.

According to another aspect of the current application, there is disclosed an on-site emulsifying system comprising a first fluid tank, a second fluid tank, a circulation loop comprising a venturi and a pump, wherein the first fluid tank and the second fluid tank are in fluid communication with the circulation loop at a feeding end of the pump via a first fluid inlet pipe and a second fluid inlet pipe, respectively; and an outlet pipe connected to a discharge end of the pump for withdrawing finished emulsions from the circulation loop.

In some embodiments, the system may further comprise a feeding pipe to a wellbore, wherein the feeding pipe is in fluid communication with the outlet pipe. In some embodiments, the first fluid and second fluid are non-miscible. In some embodiments, the first fluid can be an aqueous fluid. In some embodiments, the second fluid can be a hydrocarbon fluid. In some embodiments, the circulation loop can be formed by pipes.

According to a further aspect of the current application, there is disclosed a method for on-site mixing an aqueous fluid and an hydrocarbon fluid. The method comprises feeding the aqueous fluid to a circulation loop, feeding the hydrocarbon fluid to the circulation loop, circulating the mixture of aqueous fluid and hydrocarbon fluids in the circulation loop, withdrawing a mixed fluid from the circulation loop; and feeding the mixed fluid to a wellbore.

In some embodiments, at least one of the steps of (a) feeding the aqueous fluid to a circulation loop and (b) feeding the hydrocarbon fluid to the circulation loop comprises measuring a flow rate by a metering device. In some embodiments, the circulation loop comprises a buffering tank.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

The following description illustrates embodiments of the current application by way of example and not by way of limitation. All numbers disclosed herein are approximate values unless stated otherwise, regardless whether the word "about" or "approximately" is used in connection therewith. The numbers may vary by up to 1%, 2%, 5%, or sometimes 10 to 20%. Whenever a numerical range with a lower limit and an upper limit is disclosed, any number falling within the range is specifically and expressly disclosed.

Embodiments of the current application are illustrated below in the context of an oilfield operation commonly known as matrix acidizing. However, it should be noted that the principles of the current application may be readily applicable to other operations in the oil and gas industry as well. Similarly, although embodiments of the current application are illustrated below in the context of oil and gas exploration and production, the principles of the current application can also be used in the field other than the oil and gas industry, such as construction, automobile, mining, just to name a few. With the benefit of the information disclosed herein, people skilled in the art can readily appreciate various features and advantages of the current application and make changes and modifications accordingly. All such changes and modifications should be considered within the spirit of the current application.

In some embodiments, the current application discloses a number of systems and methods that allow an emulsion, especially an emulsified acid, to be created "on-site" while being continuously mixed for a given purpose. As used herein, the term "on-site" means that substantially all equipments are located at a single geographic location, such as a wellsite, or substantially all steps are performed at a single geographic location, such as a wellsite.

Figure 1:
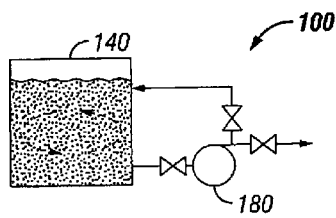
FIG. 1 is a schematic illustration of a batch mixing system according to a prior art embodiment.
Figure 2A:
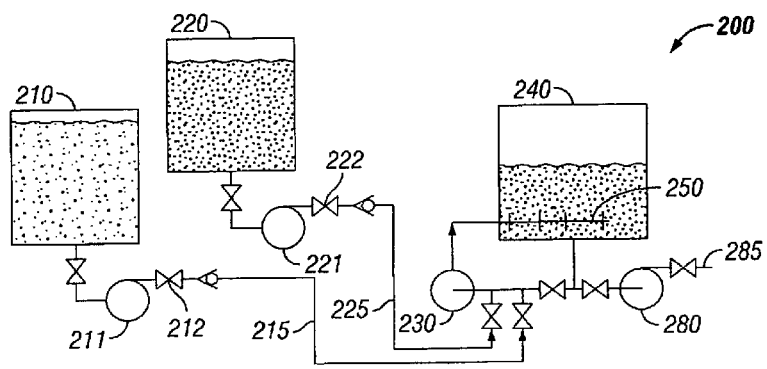
FIG. 2A is a schematic illustration of an on-site mixing system according to an embodiment of the current application, where hydrocarbon fluid is being transferred into the mix tank and the circulation is started.
Figure 2B:
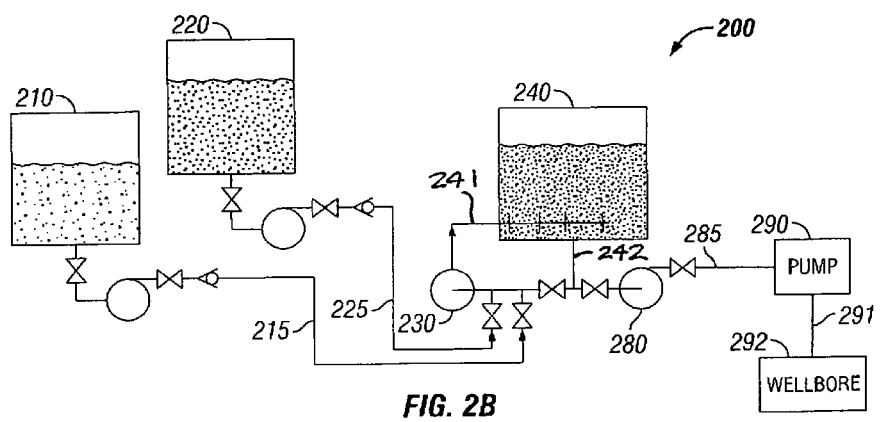
FIG. 2B is a schematic illustration of an on-site mixing system according to an embodiment of the current application, where acid is added in during circulation and emulsified acid is obtained and then pumped downhole while the system continues to mix the acid and hydrocarbon.

According to FIGS. 2A and 2B of the current application, the on-site emulsifying system 200 may comprise an aqueous fluid tank 210, an hydrocarbon fluid tank 220, and a circulation loop comprises a buffer tank 240 (having a buffer tank inlet 241 and a buffer tank outlet 242) and a centrifugal pump 230 in direct fluid communication with the buffer tank inlet 241 and a buffer tank outlet 242, wherein the aqueous fluid tank 210 and the hydrocarbon fluid tank 220 are in fluid communication with the circulation loop via an aqueous fluid inlet pipe 215 and an hydrocarbon fluid inlet pipe 225, respectively. The aqueous fluid and the hydrocarbon fluid are mixed in the circulation loop (particularly in the buffer tank) to achieve an emulsion. The emulsion can then be withdrawn as a finished product from an outlet 242 (best seen in FIG. 2B) of the buffer tank 240 by a c-pump 280 to an outlet pipe 285 that is connected to a side of the circulation loop. The side-withdrawn emulsion can then be fed into a triplex pump 290 for immediate application down the wellbore 292 via a feeding pipe 291 (best seen in FIG. 2B). The outlet 242 of the buffer tank 240 is in direct fluid communication with each of the centrifugal pumps 230 and 280 and the outlet pipe 285 as may be seen in FIGS. 2A and 2B.

In one embodiment, the aqueous fluid is an acid, such as hydrochloric acid (HCl), or a blended acid, and the hydrocarbon fluid is an organic fluid e.g. hydrocarbon (such as diesel) mixed with an appropriate amount of an emulsifying agent.

Optionally, metering valves 212, 222 can be provided on one or both of the aqueous fluid inlet pipe 215 and the hydrocarbon fluid inlet pipe 225 to control the flow rates of the fluids into the circulation loop. Also optionally, c-pumps 211, 221 can be provided on one or both of the aqueous fluid inlet pipe 215 and the hydrocarbon fluid inlet pipe 225 to provide more mixing energy to the fluids before they are introduced into the circulation loop. In some embodiments, pre-dispersion devices (not shown) or configurations can be provided on one or both of the aqueous fluid inlet pipe 215 and the hydrocarbon fluid inlet pipe 225 to pre-disperse the aqueous and/or hydrocarbon fluids, respectively, before they enter into the circulation loop.

In some embodiments, an electric conductivity meter (not shown) is provided on the outlet pipe 285 to monitor the emulsion status of the emulsion that is side-withdrawn from the circulation loop. The electric conductivity meter can produce a positive signal when the emulsion in the outlet pipe 285 is in the correct configuration, and a negative signal when the emulsion in the outlet pipe 285 is "inverted" or otherwise in an incorrect configuration. The negative signal can trigger an auto-shutdown procedure for automatically turning off the outlet pipe 285 so as to prevent the incorrectly formed emulsion from entering into the wellbore.

In operation, the acid mixture can be either pre-blended or blended continuously for the purpose of creating the emulsion. The acid mixture can be metered into a blend of the emulsifying agent, which can then be imparted with mixing energy by a devise designed to increase the shear energy of the blend. This mixture is then pumped into a buffering tank 240 that allows a portion of the pre-mixed emulsion to be blended with a new emulsion blend. This mixture of old and new blends re-undergo the mixing process to create a new blend of emulsified acid. During this process a portion of the buffering tank volume is pulled off for the use as a finished product. The ratio of the emulsified acid recirculation to the finished product delivery rate should be such that a quality emulsion can be maintained during the product delivery process. Because a portion of the blend is continually re-circulated through the mixing process that portion of the blend's emulsion becomes more stable.

In one specific embodiment, the HCl was fed into the circulation loop at a rate of about 14 barrel-per-minute (bpm), the hydrocarbon fluid containing emulsifying agent was fed into the circulation loop at a rate of about 6 bpm, the mixing c-pump 230 circulated the acid/hydrocarbon mixture in the circulation loop at a rate of about 60 bpm, and the finished emulsion was withdrawn from the outlet pipe 285 at a rate of about 20 bpm.

In some embodiments, the initial batch of emulsion is mixed before being delivered downhole. While being delivered downhole, additional emulsifying agent and acid can be mixed into the existing emulsion. The combination point is around the inlets and the circulating c-pump 230 so that incoming hydrocarbon and acid disperse into the previously-created emulsion.

Some of the emulsion is delivered downhole after only one pass through the mixing tank, but most of the fluid makes multiple passes through the circulating c-pump before going downhole. One parameter that can be adjusted during operation is the ratio of re-circulating flow to discharge flow. By controlling the ratio of re-circulated emulsion to single pass emulsion the quality of the emulsion can be controlled. In some instances the re-circulated emulsified fluid may make multiple passes through the buffering tank 240 before being discharged which can improve the emulsion quality.

Shearing energy is put into the fluid at the circulating c-pump 230 and also at the jets which mixes the tank. In some cases, there is a provision for a mixer 250 as shown in FIG. 2, but in some other cases, an additional mixing device is not used because a lot of mixing energy is added by the mixing c-Pump 230.

Figure 3A:
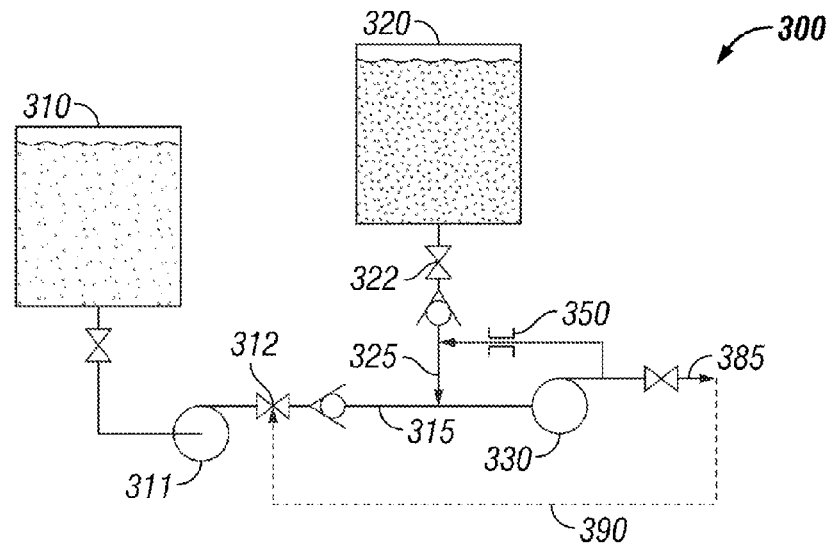
FIG. 3A is a schematic illustration of an on-site mixing system according to an embodiment of the current application, where no buffer tank is provided for the mixing, but instead, mixing is achieved within the pipes and c-pump, etc. of the circulation loop.
Figure 3B:
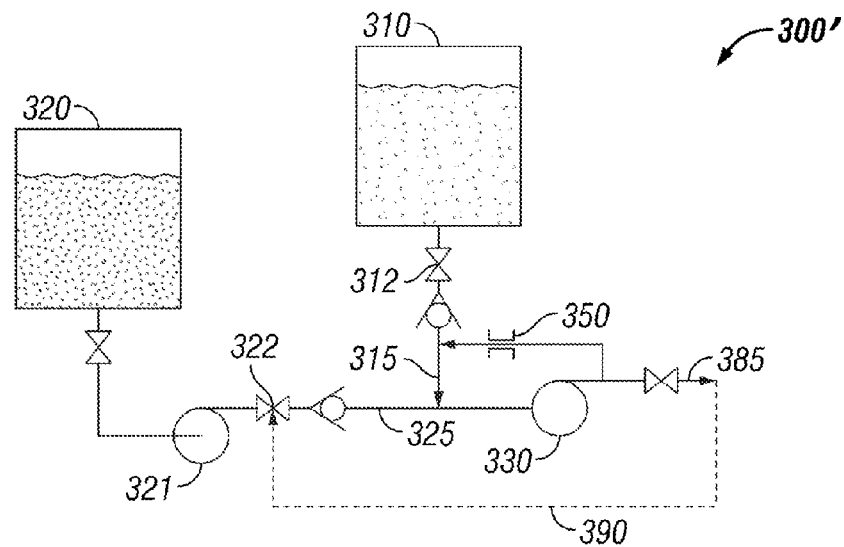
FIG. 3B is a schematic illustration of an on-site mixing system according to an embodiment of the current application, which is an alternative embodiment to FIG. 3A.

FIGS. 3A and 3B illustrate another aspect of the on-site blending method and system according to the disclosure of the current application. There, the on-site emulsifying system 300, 300' may comprise an aqueous fluid tank 310, an hydrocarbon fluid tank 320, a circulation loop formed by pipes and comprising a centrifugal pump 330, wherein the aqueous fluid tank 310 and the hydrocarbon fluid tank 320 are in fluid communication with the circulation loop (sometimes at the feeding end of the centrifugal pump 330) via an aqueous fluid inlet pipe 315 and an hydrocarbon fluid inlet pipe 325, respectively, and an outlet pipe 385 connected to the discharge end of the centrifugal pump 330 for withdrawing finished emulsions from the circulation loop. The aqueous fluid and the hydrocarbon fluid is mixed in the circulation loop to produce an emulsion, which can then be withdrawn from the outlet pipe 385 and fed into a triplex pump (such as the pump 290 shown in FIG. 2B) for immediate application down the wellbore, such as the wellbore 292 shown in FIG. 2B.

In one embodiment, the aqueous fluid is an acid, such as hydrochloric acid (HCl), or a blended acid, and the hydrocarbon fluid is a hydrocarbon (such as diesel) mixed with an appropriate amount of an emulsifying agent.

Optionally, metering valves 312, 322 are provided on one or both of the aqueous fluid inlet pipe 315 and the hydrocarbon fluid inlet pipe 325 to control the flow rates of the fluids into the circulation loop. Also optionally, c-pumps 311, 321 are provided on one or both of the aqueous fluid inlet pipe 315 and the hydrocarbon fluid inlet pipe 325 to increase the pressure the fluids before they pass the metering valves 312, 322, if any, and are introduced into the circulation loop. In one embodiment, a c-pump 311 and a meting valve 312 are provided on the hydrocarbon fluid inlet pipe.

In some embodiments, pre-dispersion devices (not shown) or configurations are provided on one or both of the aqueous fluid inlet pipe 315 and the hydrocarbon fluid inlet pipe 325 to pre-disperse the aqueous fluid and/or hydrocarbon fluid, respectively, before they enter into the circulation loop.

In some embodiments, an electric conductivity meter (not shown) is provided on the outlet pipe 385 to monitor the status of the emulsion that is side-withdrawn from the circulation loop. The electric conductivity meter can provide a positive signal when the emulsion in the outlet pipe 385 is in the correct configuration, and a negative signal when the emulsion in the outlet pipe 385 is "inverted" or otherwise in an incorrect configuration. The negative signal can trigger an auto-shutdown procedure to automatically turn off the outlet pipe 385 to prevent the wrongfully formed emulsion from entering into the wellbore.

In operation, an acid blend (not shown) can be introduced to the circulation loop just prior to the c-pump 330 designed to impart the necessary mixing energy. In some embodiments, the mix rate of the c-pump 330 is designed such that it exceeds the delivery rate of end product by a predetermined amount. The excess blended fluid is then fed directly back to the input end of the mixing device. This continuous re-circulation induces enough shear energy to create a stable emulsion in the acid blend. The flow rate feedback signal is shown in FIG. 3 by dotted line 390.

In one specific embodiment, the HCl is fed into the circulation loop at a rate of about 14 barrel-per-minute (bpm), the hydrocarbon fluid containing emulsifying agent is fed into the circulation loop at a rate of about 6 bpm, the mixing c-pump circulate the acid/hydrocarbon mixture in the circulation loop at a rate of about 40 bpm, and the finished emulsion is withdrawn from the outlet pipe at a rate of about 20 bpm.

In some cases, the hydrocarbon fluid is started at the beginning of the process with the acid metering valve closed. Hydrocarbon containing an appropriate amount of an emulsifying agent is circulated within the circulation loop, and flows towards the discharge point of the mixing c-pump 330 and purges water or other residual fluid out of the mixing c-pump 330 and the circulation pipes. Next, the acid metering valve 312 opens to achieve the correct concentration.

In some other cases, the aqueous fluid is started first and the hydrocarbon fluid is then started to achieve emulsions.

Both processes, i.e. first starting with the hydrocarbon fluid or first starting with the aqueous fluid, may optionally include a pre-wash step wherein 100% water is used to flush and prime up the circulation loop before the hydrocarbon fluid or aqueous fluid is introduced into the circulation loop.

The mixing c-pump 330 ingests hydrocarbon fluid (with emulsifying agent in some cases), aqueous fluid (acid in some cases) and circulated emulsion and mixes them to form and discharge new emulsion. In some cases, the circulating rate is several times (such as, in one aspect, 2×-4×) the maximum downhole rate so that the fluid averages several circulations before flowing to the triplex pump.

The system shown in FIG. 3 may further contain in the circulation loop a venturi e.g. a choke 350, a metering device (not shown), or other devices such as static mixers (not shown) to create back pressure in the circulation line. In a specific embodiment, the mixing c-pump 330 produces about 50 psi for charging the triplex pump 290 while circulating several times the downhole rate. In some embodiment, one cpump 330 is used for mixing at low pressure and another c-pump not shown) is used to charge the triplex pump 290.

In all of the forgoing embodiments, acid can be blended in a tank or by an acid blender using concentrated acid. In the case of HCl, the raw acid is typically at a concentration of about 32%-36%. The raw HCl can be mixed off-site with water and other chemicals to create the desired acid concentration, which is typically about 12-15% HCl. After mixing, the volume typically doubles thus increasing the amount of acid that needs to be stored or transported to the location. Therefore, it is another aspect of the current application to use an on-site acid mixing system that can blend 32-36% acid and the appropriate emulsifier on the location of application so that the storage and transportation requirements can be greatly reduced.

One intended use of the current systems and methods is the continuous matrix acidizing of a wellbore for the purpose of stimulating that wellbore for increased production; however, the disclosure of the current application can be implemented in many other areas and industries as well.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

Furthermore, none of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle. The claims as filed are intended to be as comprehensive as possible, and NO subject matter is intentionally relinquished, dedicated, or abandoned.

What is claimed is:

1. An on-site emulsifying system comprising:
    a first fluid tank for containing a first fluid;
    a second fluid tank for containing a second fluid;
    a circulation loop comprising a buffer tank having an inlet and an outlet and a circulation pump in direct fluid communication with the buffer tank inlet and the buffer tank outlet, wherein the first fluid tank and the second fluid tank are in fluid communication with the buffer tank outlet of the circulation loop via a first fluid inlet pipe and a second fluid inlet pipe, respectively, and wherein the circulation loop is configured to circulate a mixture of the first and second fluids into the inlet and out the outlet of the buffer tank and then back into the inlet of the tank via the circulation pump;
    a c-pump that is in direct fluid communication with the outlet of the buffer tank and in fluid communication with an outlet pipe that is in fluid communication with a wellbore pump; and
    a feeding pipe in fluid communication with the wellbore pump and a wellbore for immediate application of the fluid in the wellbore.

2. The system of claim 1, wherein the first fluid and the second fluid are non-miscible.

3. The system of claim 1, wherein the first fluid is an aqueous fluid.

4. The system of claim 3, wherein the second fluid is an organic fluid selected from the group consisting of hydrocarbon, diesel oil, kerosene, paraffinic oil, crude oil, LPG, toluene, xylene, ether, ester, mineral oil, biodiesel, vegetable oil, animal oil, and mixtures thereof.

5. The system of claim 4, wherein the first fluid tank contains an acid or a blended acid and the second fluid tank contains an organic fluid mixed with an appropriate amount of an emulsifying agent.

6. The system of claim 1, wherein at least one of the first fluid inlet pipe and the second fluid inlet pipe contains a metering valve.

7. The system of claim 1, wherein the c-pump is configured to withdraw a portion of the mixture from the circulation loop and deliver the portion of the mixture to the outlet pipe.

8. The system of claim 1, wherein at least one of the first fluid inlet pipe and the second fluid inlet pipe contains a pre-dispersing device.

9. The system of claim 1, wherein the outlet pipe contains an electric conductivity meter for monitoring an emulsifying status of an emulsion.

10. The system of claim 1, wherein the wellbore pump comprises a triplex pump.

11. A method comprising:
    feeding an aqueous fluid to a circulation loop that is located on-site, wherein feeding comprising passing the aqueous fluid through an inlet pipe and into a portion of the circulation loop that is coupled to the inlet pipe;
    feeding a hydrocarbon fluid to the circulation loop;
    circulating a mixture of the aqueous fluid and the hydrocarbon fluid in the circulation loop;
    delivering the mixture into an inlet of a buffering tank disposed within the circulation loop, the buffering tank having an outlet disposed within the circulation loop;
    withdrawing a first portion of the mixture directly from the buffering tank outlet of the circulation loop with a c-pump;
    feeding the first portion of the mixture from the c-pump to a wellbore pump for immediate application in a wellbore;
    recirculating, with a circulating pump, a second portion of the mixture within the circulation loop, wherein recirculating comprises circulating the second portion of the mixture into the inlet and out the outlet of the buffering tank and then back into the inlet of the buffering tank, wherein recirculating further comprising passing the second portion of the mixture through the portion of the circulation loop that is coupled to the inlet pipe; and controlling a quality of the mixture by adjusting a ratio of a re-circulating flow within the circulation loop to a discharge flow from the circulation loop.

12. The method of claim 11, wherein at least one of said feeding the aqueous fluid to the circulation loop and said feeding the hydrocarbon fluid to the circulation loop comprises measuring a flow rate by a metering device.

13. The method of claim 11, wherein said withdrawing the first portion of the mixture from the circulation loop comprises withdrawing the first portion after the first portion has exited the buffering tank, and wherein said recirculating the second portion of the mixture within the circulation loop comprises delivering the second portion of the mixture to the buffering tank after the second portion of the mixture has previously exited the buffering tank.

14. The method of claim 11, wherein said recirculating the second portion of the mixture within the circulation loop comprises causing the second portion of the mixture to exit and enter the buffering tank to make multiple passes through the buffering tank.

15. The method of claim 11, wherein the mixture of the aqueous fluid and the hydrocarbon fluid is formed in the circulation loop.

16. The method of claim 11, wherein said recirculating the second portion of the mixture within the circulation loop comprises passing the second portion of the mixture through a pump.

17. The method of claim 11, further comprising passing the second portion of the mixture through the circulation loop multiple times.

18. The method of claim 11, further comprising feeding the second portion of the mixture to the wellbore after the second portion of the mixture has been passed through the circulation loop multiple times.

19. The method of claim 11, further comprising blending the second portion of the mixture with an additional mixture of the aqueous fluid and the hydrocarbon fluid.

20. The method of claim 11, wherein the wellbore pump comprises a triplex pump.

* * * * *